United States Patent [19]

Fabre et al.

[11] 3,912,054

[45] Oct. 14, 1975

[54] VALVE REPLACEMENT ASSEMBLY FOR MOTORCYCLE FRONT FORKS

[76] Inventors: Brian K. Fabre, 9447 Haines Canyon, Tujunga, Calif. 91352; John S. Vander Laan, III, 11509 Bexley Drive, Whittier, Calif. 90606

[22] Filed: Nov. 25, 1974

[21] Appl. No.: 527,068

[52] U.S. Cl. .............. 188/282; 137/514; 188/317; 188/322; 280/276
[51] Int. Cl.² .......................................... F16F 9/34
[58] Field of Search .......... 188/279, 281, 282, 289, 188/313, 316, 317, 322; 280/276; 137/514, 514.5, 514.7

[56] References Cited
UNITED STATES PATENTS

| | | | |
|---|---|---|---|
| 3,003,595 | 10/1961 | Patriquin | 188/289 |
| 3,006,628 | 10/1961 | Utting | 188/317 |
| 3,367,454 | 2/1968 | Schenk et al. | 188/317 |
| 3,724,681 | 4/1973 | Anderson et al. | 188/317 |
| 3,810,659 | 5/1974 | Marcil | 188/322 |

FOREIGN PATENTS OR APPLICATIONS

| | | | |
|---|---|---|---|
| 1,004,261 | 3/1952 | France | 188/289 |
| 554,983 | 7/1943 | United Kingdom | 188/322 |

*Primary Examiner*—George E. A. Halvosa
*Assistant Examiner*—Edward R. Kazenske
*Attorney, Agent, or Firm*—Edgar W. Averill, Jr.

[57] ABSTRACT

A valve replacement assembly is disclosed herein which improves the shock absorbing characteristics of motorcycle front forks of the type which have aluminum alloy fork sliders and which have an internal perforated disc valve. The main structural components of the front forks are left unchanged and the shock absorbing characteristics are significantly altered by the replacement of the conventional perforated valve ring with a generally cylindrical valve having a plurality of passage ways leading from the outside cylindrical surface to the inside cylindrical surface. This valve is positioned within a sleeve member having a height slightly greater than the thickness of the valve member. The sleeve member abuts an upper washer which serves to limit the upper travel of the valve. The lower travel of the valve is limited by the existing piston member of the front fork.

6 Claims, 3 Drawing Figures

U.S. Patent   Oct. 14, 1975   3,912,054
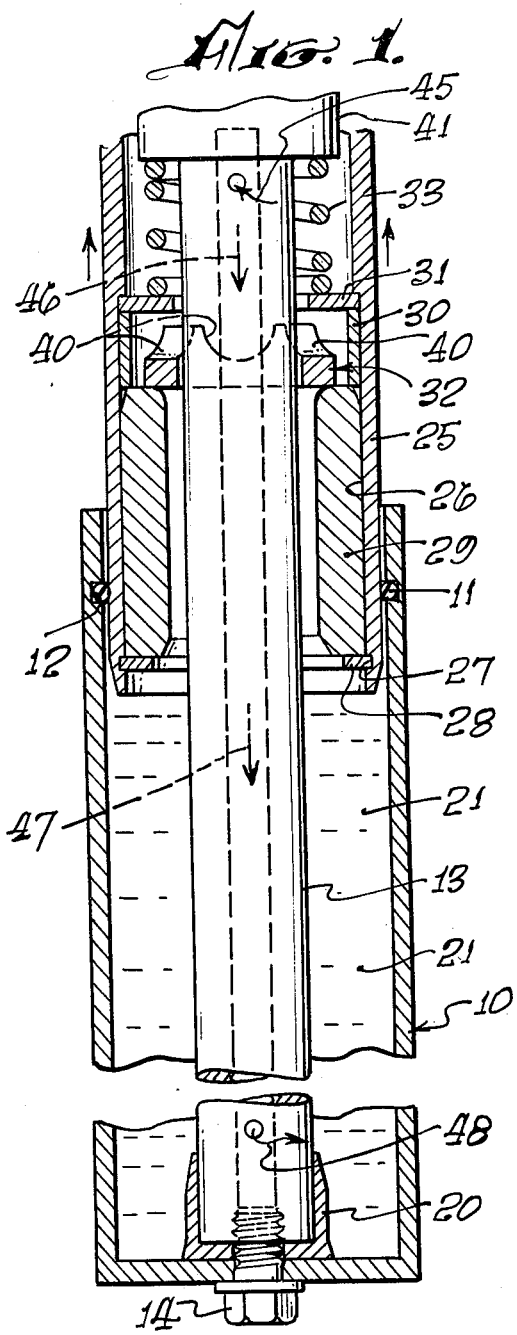
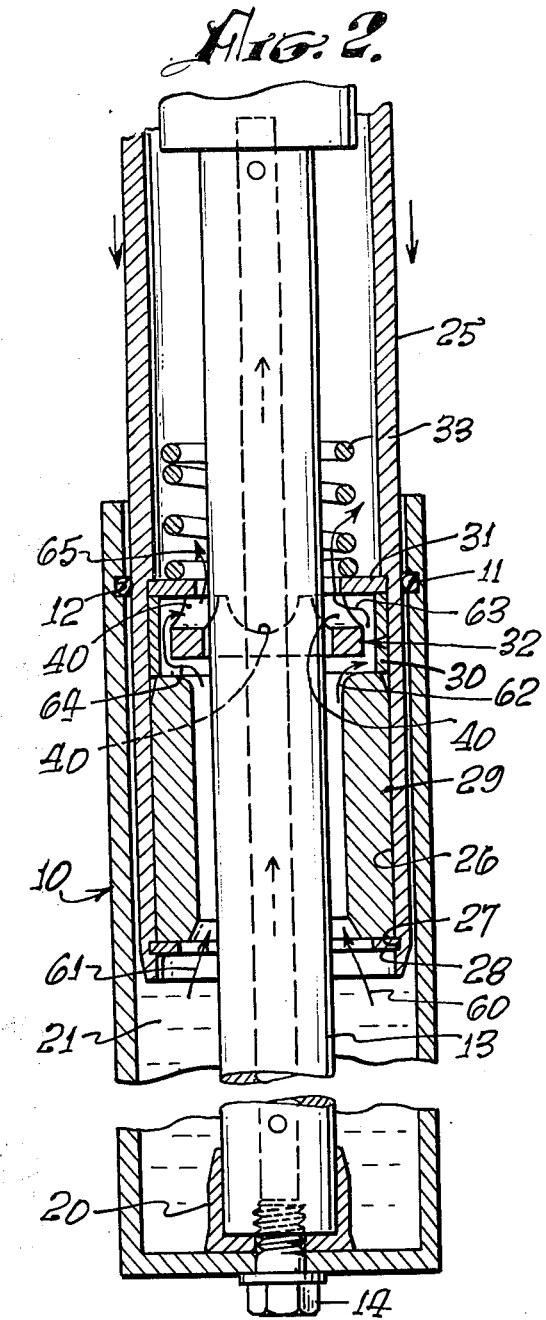
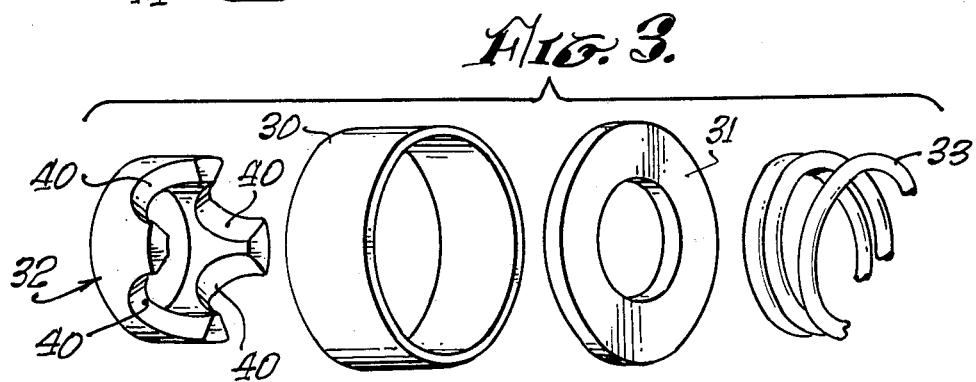

VALVE REPLACEMENT ASSEMBLY FOR MOTORCYCLE FRONT FORKS

BACKGROUND OF THE INVENTION

Motorcycle front forks are shock absorbers and serve to dampen the upward and downward movement of the front wheel with respect to the frame. Shock absorbers used for this purpose perform far less of a damping action on compression than they do on extension. A common method of causing this variable damping effect is to install a two-position valve in a damping medium such as motor oil. When the shock absorber is compressed, the oil flows through the valve in one direction and when the shock absorber is extending the oil flows through a different path. The valve or combination of valves are so constructed that the resistance to flow is greater during extension than it is during compression.

Most variable resistance valves are commonly fabricated from a ring or washer having a plurality of openings drilled through the middle of the washer midway between its inside and outside diameters and parallel to its axis. The valve is positioned in a chamber located above a piston and during compression or extension the hydraulic damping fluid is caused to flow through the valve.

When the motorcycle is used for cross-country or motocross the commonly used shock absorbers impart an undesirably high degree of impact on compression but the high cost of new front shock absorbers makes the conversion to softer shock absorbers so expensive that the average user does not wish to make the change.

SUMMARY OF THE INVENTION

The present invention is for a simple assembly to make a substantial improvement in the off the road performance of a motorcycle without having to replace the entire front shock absorbers. The invention is for a valve replacement assembly of the type which have aluminum alloy fork sliders which comprise the lower cylinder of the shock absorbers. The replacement assembly comprises a washer member having about the same outside diameter as the piston of the shock absorber to be improved. A thin walled sleeve member is positioned abutting the washer member, both of these members having about the same outside diameter. The inside diameter of the washer member is substantially larger than the outside diameter of the damper rod which is the central structural part of the original shock absorber. The inside diameter of the sleeve member is substantially larger than the inside diameter of the washer member and the sleeve and washer form a chamber for a generally ring-shaped valve means. The valve means has an inside diameter approximately equal to the outside diameter of the damper rod of the shock absorber to be improved. The valve means also has a generally flat bottom surface, and a plurality of passageways located above the bottom surface which permits the flow of oil therethrough without a significant pressure drop. The top surface of the valve means is configured to cause the bottom surface of the valve to be positioned in a plane parallel to the plane of the washer member when the valve is held against the washer member. The distance between the bottom surface of the valve and the plane of the bottom surface of the sleeve is critical and is the measurement which determines the damping action on compression. Preferred passageways are semi-circular in cross section and ideally are hemi-circular and of a size so that the intersection of the passageways and the inside cylindrical surface of the valve occupies about 90° of the upper circumference of said valve.

BRIEF DESCRIPTION OF THE DRAWINGS

FIG. 1 is a side elevation partly in cross section and partly cut away of a shock absorber of the type used on the front end of motorcycles.

FIG. 2 is a side elevation partly in cross section of the assembly of FIG. 1 in a partially compressed configuration.

FIG. 3 is a perspective view of the elements of the valve replacement assembly.

DESCRIPTION OF THE PREFERRED EMBODIMENTS

A side elevation of a shock absorber utilizing the valve assembly of the present invention is shown in FIG. 1. The lower portion of the shock absorber is shown schematically and does not include features such as means for attachment to the front wheel, oil draining means and the like since such features need not be shown for an understanding of the operation of the present invention. The slider 10 forms the lower oil cylinder and, in the type of shock absorber shown here, is generally fabricated from an aluminum alloy. An O-ring 11 is positioned in a groove 12 located on the inner wall of slider 10. A damper rod 13 is held to slider 10 by a damper rod screw 14.

The damper rod 13 is hollow and is typically set in a cone 20. Cone 20 may contain a plurality of passageways to assist the flow of oil from the slider reservoir through damper rod 13 or may simply be a solid mounting piece as shown in the drawings. A hydraulic fluid such as motor oil 21 is held in and fills slider 10 and its viscosity, of course, affects the damping characteristics of the shock absorber in a manner known to those skilled in the art. The body of the upper half of the shock absorber is the stanchion 25 which houses the piston and valve assembly. Stanchion 25 has a first inner enlargement 26 which forms a chamber for the piston and valve members. A second groove 27 is formed on the inner surface of the stanchion and holds a snap ring 28 which holds the piston valve assembly and thus the damper rod in the stanchion. Piston 29 is a heavy walled cylinder having an inside diameter significantly larger than the outside diameter of damper rod 13. This annular space between piston 26 and damper rod 13 forms a passageway for the oil 21 and provides some damping action. A sleeve 30 rests on the upper surface of piston 29 and is held from further upward movement by washer 31 which is at the uppermost terminus of piston chamber 26. The inside diameter of stanchion 25 decreases above washer 31 so that the piston and valve assembly are securely held in place between snap ring 28 and washer 31.

Valve 32 moves between contact with piston 29 and washer 31 depending upon the direction of flow of oil in the shock absorber. Valve 32 is shown in perspective view in FIG. 3 and is a thick walled cylindrical ring having an inside diameter a very small amount larger than the outside diameter of damper rod 13 and having an outside diameter substantially smaller than the inside diameter of sleeve 30. Four hemi-circular passageways 40 are formed in the upper surface of valve 32. Although the shape of the passageways is important, they do not form the point of maximum pressure drop and thus other shapes may be used which will permit the flow of oil without unduly weakening the structural strength of the valve. A rebound spring 33 rests on the upper surface of washer 31 and when the shock absorber is fully extended as shown in FIG. 1 also contacts bushing 41 which is affixed to damper rod 13. A fork spring rests on the upper surface of bushing 41 and is not shown in the drawings since it is conventional.

The shock absorber is positioned in FIG. 1 at the moment of full extension. During the extension process the path of least resistance of the oil is indicated by arrows 45 through 48. During extension the pressure above valve 32 is greater than the pressure below valve 32 and thus the valve closes against piston 29 and no substantial amount of oil is permitted to flow along the exterior of of damper rod 13 and thus is forced to follow the path indicated by arrows 45 through 48.

The reverse action is shown in FIG. 2 during compression such as when the motorcycle hits a bump. During compression, the pressure of oil 21 in slider 10 is greater than the pressure of oil in the upper part of stanchion 25 thereby causing valve 32 to move upwardly and abut against washer 31. The path of least resistance for oil flow is now no longer through the center of damper rod 13 but is instead along the outside of the damper rod generally indicated by arrows 60 through 65. While a substantial amount of pressure drop is caused by the flow of oil between piston 29 and damper rod 13 the major point of pressure drop is between the lower surface of valve 32 and the upper surface of piston 29. The pressure drop around the exterior of valve 32 between the valve and sleeve 30 and that caused by the flow of oil between washer 31 and damper rod 13 is relatively slight compared to the pressure drop at the lower surface of the valve. The amount of this major pressure drop is determined by the spacing between the top of the piston and the bottom of the valve. This space is equal to the height of sleeve 30 and the height of valve 32. This distance should be no greater than 0.040 inches for conventional front forks of the type described herein. The best distance is also affected by the hydraulic fluid used, the higher the viscosity of the oil, the greater the optimum difference. The important feature of this valve is that the parts be configured so that this distance serve as the point of maximum pressure drop of the oil path.

Conventional motorcycle front fork shock absorbers having aluminum alloy sliders utilize all the parts shown in FIG. 1 with the exception of those parts which are also shown in FIG. 3. In place of the parts shown in FIG. 3 conventional front fork shock absorbers typically utilize an assembly including a pair of rings each ring having a plurality of holes drilled through it parallel to the center axis of the ring. In compression, the oil is allowed to flow through the rings in a relatively unobstructed manner whereas upon extension the holes in one of the rings is partially blocked increasing the damping action. Not only are such rings relatively expensive to fabricate, but they also are more readily plugged by foreign matter. The valve may be fabricated from any material having sufficient structural strength to withstand the impact caused by compression and extension. It is beneficial that the valve be fabricated from a light weight material such as an aluminum alloy. While the present invention has been described as being useful for front fork shock absorbers having aluminum alloy sliders, the invention is, of course, not limited to use only when the sliders are fabricated from aluminum. The term "aluminum" is used for convenience to describe the design of sliders of the type shown in the drawings which, at present, are typically fabricated from an aluminum alloy.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A valve replacement assembly for improving the shock absorbing characteristics of motorcycle front wheel shock absorbers of the type having a stanchion slidable in an oil filled cylindrical slide, a piston mounted on said stanchion and positioned around a hollow damper rod mounted in said slide so that oil may flow through a passage between the rod and the piston, said assembly comprising:

a washer member having an outside diameter about equal to the outside diameter of the piston of the shock absorber, and an inside diameter substantially larger than the outside diameter of the damper rod of said shock absorber;

a thin walled sleeve member abutting said washer member, said sleeve member having an outside diameter about equal to the outside diameter of said washer member and having a height sufficient to fill a space between the upper surface of the piston of the shock absorber and said washer member; and a generally ring-shaped valve means having an inside diameter approximately equal to the outside diameter of the damper rod of the shock absorber, a generally flat bottom surface, a plurality of passageways located above said bottom surface, and sufficient in size and number to permit the flow of oil therethrough without significant pressure drop when said valve is in an installed position above a piston, a top surface configured to cause said bottom surface to be located in a plane parallel to the plane of said washer member when said valve is held against said washer member, the annular space between the bottom surface of said valve and the plane of the bottom surface of said sleeve when said valve and said sleeve are co-axially held against said washer means being the location of maximum pressure drop of oil flow around said valve.

2. The assembly of claim 1 wherein the height of said annular space is about 0.040 inches.

3. The assembly of claim 1 wherein said passageways are semi-circular in cross section and the central axis of said semi-circle is perpendicular to the central axis of said valve means.

4. The assembly of claim 1 wherein there are four of said passageways.

5. The assembly of claim 4 where said passageways are hemi-circular having an axis perpendicular to the axis of said valve and the bottom surface of said passageways are nearer said bottom surface than said top surface.

6. The assembly of claim 5 wherein the outside diameter of said hemi-circular passageways intersect at the inner surface of said valve.

* * * * *